United States Patent
Rush et al.

(10) Patent No.: US 10,640,095 B2
(45) Date of Patent: May 5, 2020

(54) COMMUNICATION SYSTEMS

(71) Applicant: General Electric Company, Schenectady, NY (US)

(72) Inventors: Daniel Joseph Rush, Melbourne, FL (US); Michael Brandon Alexander, Melbourne, FL (US); Derek Kevin Woo, Melbourne, FL (US); Robert Carmen Palanti, Melbourne, FL (US)

(73) Assignee: General electric company, Schenectady, NY (US)

( * ) Notice: Subject to any disclaimer, the term of this patent is extended or adjusted under 35 U.S.C. 154(b) by 0 days.

(21) Appl. No.: 15/360,118

(22) Filed: Nov. 23, 2016

(65) Prior Publication Data
US 2018/0143623 A1 May 24, 2018

(51) Int. Cl.
| | |
|---|---|
| *B60T 7/02* | (2006.01) |
| *B60T 13/66* | (2006.01) |
| *B60W 30/00* | (2006.01) |
| *B60T 7/16* | (2006.01) |
| *B61L 15/00* | (2006.01) |

(52) U.S. Cl.
CPC ............ *B60T 7/02* (2013.01); *B60T 7/16* (2013.01); *B60T 13/662* (2013.01); *B60W 30/00* (2013.01); *B61L 15/0027* (2013.01); *B61L 15/0036* (2013.01); *B61L 15/0072* (2013.01)

(58) Field of Classification Search
CPC .................................................... G05D 1/0011
See application file for complete search history.

(56) References Cited

U.S. PATENT DOCUMENTS

| | | |
|---|---|---|
| 6,697,951 B1 | 2/2004 | Sinha et al. |
| 7,155,320 B2 | 12/2006 | Gee |
| 8,239,078 B2 | 8/2012 | Siddappa et al. |
| 8,328,144 B2 | 12/2012 | Smith |

(Continued)

OTHER PUBLICATIONS

A Knorr Brake Company, "IP-189 Technical Description Integrated Train Control System", New York Air Brake Corporation, (p. 1-27), Apr. 29, 2003.

(Continued)

*Primary Examiner* — Imran K Mustafa
(74) *Attorney, Agent, or Firm* — The Small Patent Law Group LLC; Joseph m. Butscher (57) ABSTRACT

A communication system includes wired communication devices onboard vehicles of a vehicle system, wireless communication devices disposed onboard other vehicles, and a controller. The controller remotely controls movement of some vehicles via communication with the wired communication devices and establishes a wireless communication link with other vehicles. The controller remotely controls movement of the other vehicles via wireless communication responsive to these vehicles being connected to the vehicle system for temporarily assisting in vehicle system movement along one or more routes. These vehicles are configured to be disconnected from wired communication with the other vehicles subsequent to being connected to the vehicle system. The wireless communication link is in addition to any wireless communication links established in the vehicle system prior to the one or more second vehicles being connected to the vehicle system.

17 Claims, 4 Drawing Sheets

(56) References Cited

U.S. PATENT DOCUMENTS

| | | |
|---|---|---|
| 9,415,756 B2 | 8/2016 | Smith et al. |
| 2007/0228813 A1 | 10/2007 | Smith |
| 2010/0130124 A1 | 5/2010 | Teeter et al. |
| 2011/0060486 A1* | 3/2011 | Meltser .................. B61C 17/12 701/19 |
| 2013/0261842 A1* | 10/2013 | Cooper .............. B61L 15/0081 701/1 |
| 2017/0106888 A1* | 4/2017 | Shubs, Jr. ........... B61L 27/0061 |

OTHER PUBLICATIONS

Knorr-Bremse, "IP-242 Operation Instruction Manual Wire DP® Wire-based Distributed Power System", Rail Vehicle Systems, New York Air Brake Corporation, (p. 1-103), Jul. 27, 2010.

\* cited by examiner

COMMUNICATION SYSTEMS

FIELD

Embodiments of the subject matter disclosed herein relate to systems that communicate between remote locations, such as between different vehicles.

BACKGROUND

Vehicle systems may be formed of two or more vehicles that travel together along routes. The movements of these vehicles may be controlled by an operator onboard one of the vehicles. The vehicles may be communicatively coupled by wired connections between the vehicles. The operator may remotely control other vehicles in the vehicle system by directing control signals to be communicated through the wire or wires that couple the vehicles. One such arrangement of vehicles can be referred to as a distributed power (DP) arrangement.

Occasionally, a vehicle system may not have sufficient tractive power to move the vehicle system through a segment of a route. This situation can occur, for example, when the weight and/or size of the vehicle system is or are too large for the propulsion-generating vehicles in the vehicle system to move the vehicle system up an inclined grade and/or over a peak in the route. This also may occur when one or more of the propulsion-generating vehicles is damaged, has failed, or is otherwise unable to provide sufficient tractive effort to propel the vehicle system up the incline or over the peak.

One or more additional propulsion-generating vehicles can be added to a vehicle system to provide more tractive effort and help propel the vehicle system up the incline and/or over the peak. These additional vehicles may be referred to as banker vehicles.

In order to also remotely control the banker vehicles that are added to the vehicle system, the banker vehicles may need to be communicatively coupled with the other vehicles in the vehicle system by one or more wires. This can require significant time and effort to stop the vehicle system, connect the banker vehicle or vehicles to the vehicle system, and conductively couple communication systems of the banker vehicles with the other vehicles in the vehicle system. During this process, the vehicle system may be required to remain stationary and unable to move toward a scheduled location.

BRIEF DESCRIPTION

In one embodiment, a system includes plural wired communication devices disposed onboard different first vehicles of a vehicle system formed from the first vehicles, one or more wireless communication devices disposed onboard one or more second vehicles, and a vehicle system controller configured to be disposed onboard the vehicle system. The vehicle system controller is configured to remotely control movement of one or more of the first vehicles via communication with the wired communication devices disposed onboard the one or more first vehicles and to establish a wireless communication link with the one or more second vehicles. The controller also is configured to remotely control movement of the one or more second vehicles via wireless communication with the one or more wireless communication devices, responsive to the one or more second vehicles being connected to the vehicle system for temporarily assisting in vehicle system movement along one or more routes. The one or more second vehicles are configured to be disconnected from wired communication with the first vehicles subsequent to being connected to the vehicle system. The wireless communication link is in addition to any wireless communication links established in the vehicle system prior to the one or more second vehicles being connected to the vehicle system.

In one embodiment, a system includes a vehicle system controller configured to be disposed onboard a lead vehicle in a vehicle system formed from the lead vehicle and one or more remote vehicles. The vehicle system controller is configured to communicate one or more control signals to the one or more remote vehicles via wired communication devices conductively coupled with each other. The one or more control signals remotely control movement of the one or more remote vehicles. Responsive to adding one or more additional vehicles to the vehicle system subsequent to the vehicle system traveling over at least a portion of one or more routes with the lead vehicle and the one or more remote vehicles and without the one or more additional vehicles, the vehicle system controller also is configured to establish one or more wireless communication connections with the one or more additional vehicles and to wirelessly communicate the one or more control signals with one or more additional vehicles via wireless communication devices to remotely control movement of the one or more additional vehicles.

In one embodiment, a system includes a vehicle system controller configured to be disposed onboard a vehicle system having plural first propulsion generating vehicles. At least some of the propulsion generating vehicles are separated from one another by non-propulsion generating vehicles. The vehicle system controller is configured to control all the plural propulsion generating vehicles of the vehicle system using a wired connection only. The system also includes a wireless communication unit configured to be disposed onboard the vehicle system. The vehicle system controller is configured to control the wireless communication unit to automatically establish at least one wireless communication link with one or more second propulsion generating vehicles, for remote control of the one or more second propulsion generating vehicles using wireless communications only, responsive to the one or more second propulsion generating vehicles being temporarily coupled to the vehicle system for assisting in movement of the vehicle system.

In one embodiment, a method includes remotely controlling movement of one or more remote vehicles in a vehicle system that also includes a lead vehicle by communicating one or more control signals to the one or more remote vehicles via wired communication devices conductively coupled with each other. The method also includes, subsequent to controlling the movement of the one or more remote vehicles via the wired communication devices and responsive to one or more additional vehicles being added to the vehicle system, remotely controlling movement of the one or more additional vehicles by wirelessly communicating the one or more control signals to the one or more additional vehicles concurrently or simultaneously with communication of the one or more control signals to the one or more remote vehicles via the wired communication devices.

BRIEF DESCRIPTION OF THE DRAWINGS

The subject matter described herein will be better understood from reading the following description of non-limiting embodiments, with reference to the attached drawings, wherein below.

DETAILED DESCRIPTION

One or more embodiments of the inventive subject matter described herein provide communication systems that allow for both wired and wireless communications with vehicles of a vehicle system in order to remotely control movements (e.g., tractive efforts and/or braking efforts) of the vehicles. At least one technical effect described herein includes the addition of one or more vehicles to a vehicle system having other vehicles communicatively coupled with each other by one or more wired connections. The additional vehicle or vehicles can be remotely controlled from onboard a vehicle of the vehicle system via a wireless connection instead of the wired connections. This can allow for additional vehicles to be easily and quickly added to a vehicle system to provide additional tractive and/or braking efforts to the vehicle system.

Figure 1:
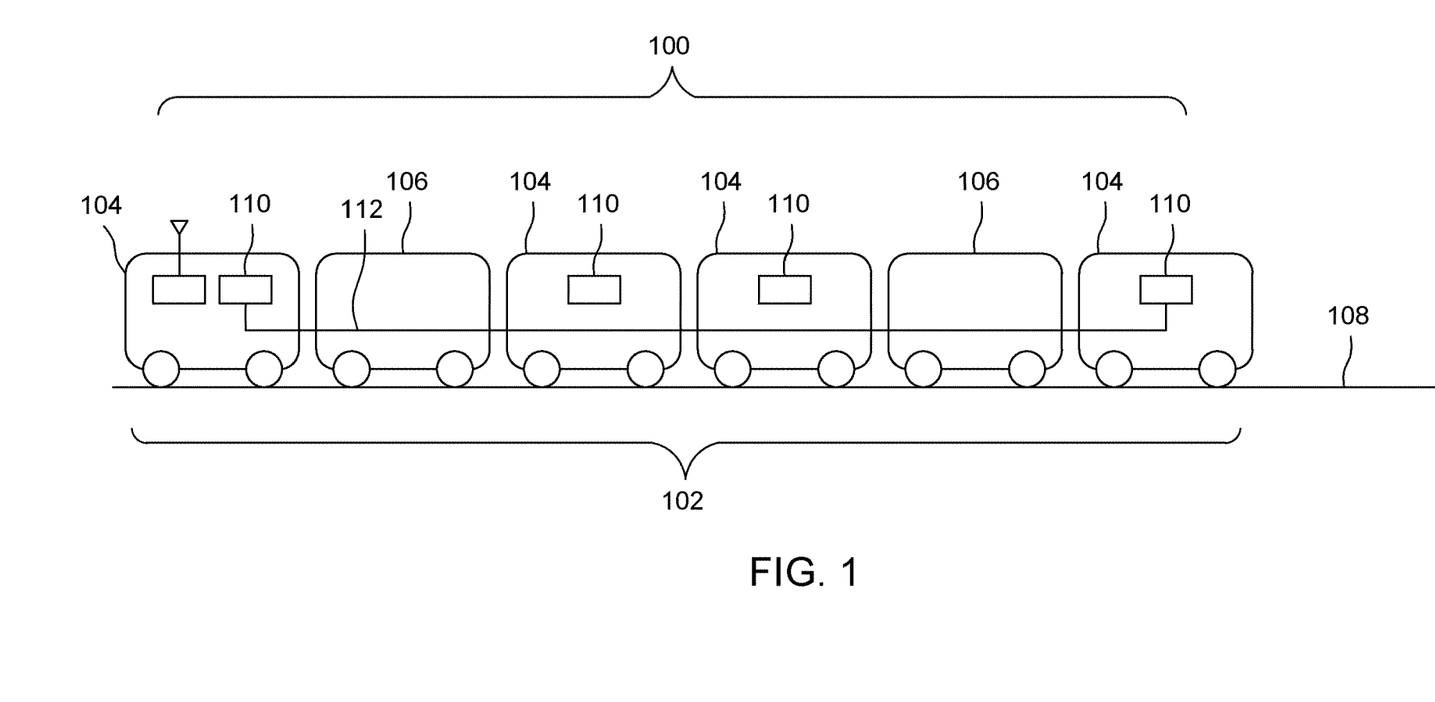
FIG. 1 illustrates one embodiment of a communication system of a vehicle system.

FIG. 1 illustrates one embodiment of a communication system 100 of a vehicle system 102. The vehicle system includes two or more propulsion-generating vehicles 104 and optionally one or more non-propulsion-generating vehicles 106. The propulsion-generating vehicles are vehicles capable of generating propulsive force or tractive effort to move the vehicle system along one or more routes 108. Examples of propulsion-generating vehicles include rail vehicles (e.g., locomotives), automobiles, trucks, and mining vehicles. The non-propulsion-generating vehicles are vehicles that are incapable of generating tractive effort or propulsive force to move the vehicle system. Examples of non-propulsion-generating vehicles include rail cars, trailers, mining buckets, etc. In another example, a vehicle system may be a train having plural locomotives and plural rail cars.

The communication system may be distributed among two or more of the vehicles in the vehicle system. The communication system may include wired communication devices 110 disposed onboard different propulsion-generating vehicles and communicatively coupled with each other by one or more conductive pathways 112. The conductive pathways can include one or more wires, cables, buses, or the like, that extend along the length of the vehicle system between the wired communication devices. The wired communication devices communicate with each other by conducting signals through the conductive pathways between the vehicles.

At least one of the vehicles in the vehicle system includes a vehicle system controller (not shown in FIG. 1) formed from hardware circuitry that includes and/or is connected with one or more processors (e.g., microprocessors, field programmable gate arrays, and/or integrated circuits). The system controller can receive instructions for controlling movement of the vehicle system from an input device (not shown in FIG. 1). These instructions can dictate throttle settings, brake settings, speeds, etc., of one or more of the vehicles in the vehicle system. The wired communication device onboard the vehicle in which an instruction is received (referred to as a lead vehicle, even if the vehicle is not disposed at the front end of the vehicle system along a direction of travel of the vehicle system) may communicate the instruction or instructions to the wired communication device or devices of the vehicles that are to be remotely controlled by the instructions (referred to as remote vehicles, even if one or more of these vehicle may be adjacent to the lead vehicle or disposed at the front end of the vehicle system). For example, the wired communication device onboard the lead vehicle may communicate control signals to the wired communication devices onboard the remote vehicles via the conductive pathways.

One or more additional propulsion-generating vehicles may be added to the vehicle system to assist the vehicle system in traveling along the routes. These additional propulsion-generating vehicles may be referred to as banker vehicles, and can be added to the vehicle system after the vehicle system has traveled over a portion of a trip. For example, the vehicle system may have a trip from a first location to a different, second location. At an intermediate location between the starting and destination locations, one or more additional vehicles may be added to the vehicle system. The additional vehicle(s) may be propulsion-generating vehicles that supply more tractive effort to increase the total propulsive force that propels the vehicle system along the route. Optionally, the additional vehicle(s) may be propulsion-generating vehicles and/or non-propulsion-generating vehicles that provide additional braking force to increase the total braking force that slows movement of the vehicle system along the route. The additional vehicle(s) may be added to the vehicle system for a temporary distance or time. For example, prior to reaching the second location, the additional vehicle(s) may be decoupled from the vehicle system and the vehicle system can continue traveling to the second destination without the additional tractive effort or braking effort provided by the additional vehicle(s).

Figure 2:
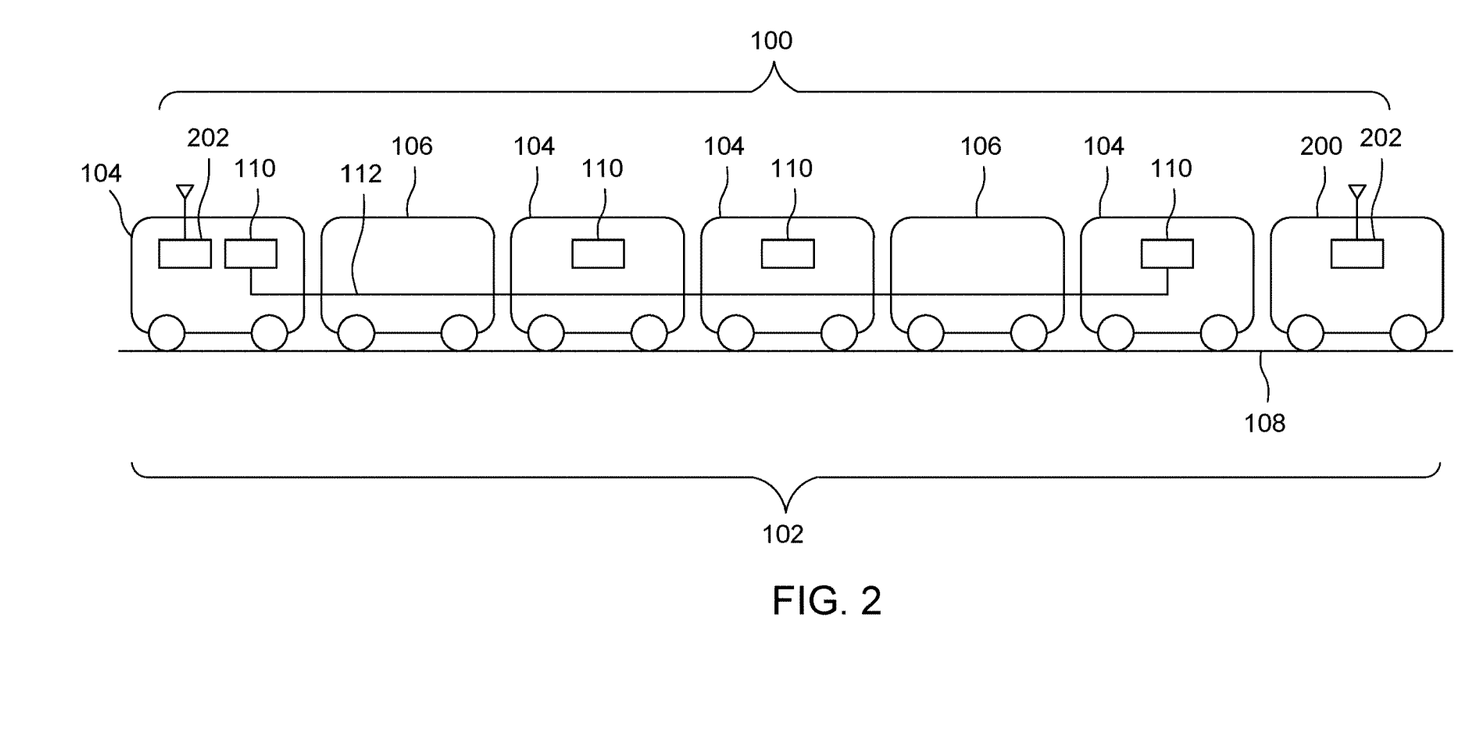
FIG. 2 illustrates the vehicle system shown in FIG. 1 with an additional or banker vehicle added to the vehicle system.

With continued reference to FIG. 1, FIG. 2 illustrates the vehicle system 102 shown in FIG. 1 with an additional or banker vehicle 200 added to the vehicle system. The additional vehicle can represent another propulsion-generating vehicle, such as one of the vehicles 106. At least one of the propulsion-generating vehicles in the vehicle system (prior to addition of the additional vehicle) and the additional vehicle may have wireless communication devices 202 disposed onboard. The addition of the additional vehicle to the vehicle system expands the communication system to also include the wireless communication device of the additional vehicle. While only one additional vehicle is shown as being added to the vehicle system in FIG. 2, optionally, more than two additional vehicles may be added. Although not shown in FIGS. 1 and 2, the vehicles in the vehicle system (including the additional vehicle in FIG. 2) may be mechanically coupled with each other by couplers). Alternatively, the vehicles may not be mechanically coupled (e.g., the additional vehicle may not be mechanically coupled to the vehicles in the vehicle system shown in FIG. 1).

The system controller onboard one of the vehicles in the vehicle system shown in FIG. 1 can continue to remotely control movement of the vehicles 104, 106 in the vehicle system via communication with the wired communication devices. This same system controller also can remotely control movement of the additional vehicle that is added to the vehicle system via wireless communication between the wireless communication devices. This system controller can use both wired- and wireless-communications to remotely control the vehicles 106, 200 during movement of the vehicle system.

Figure 3:
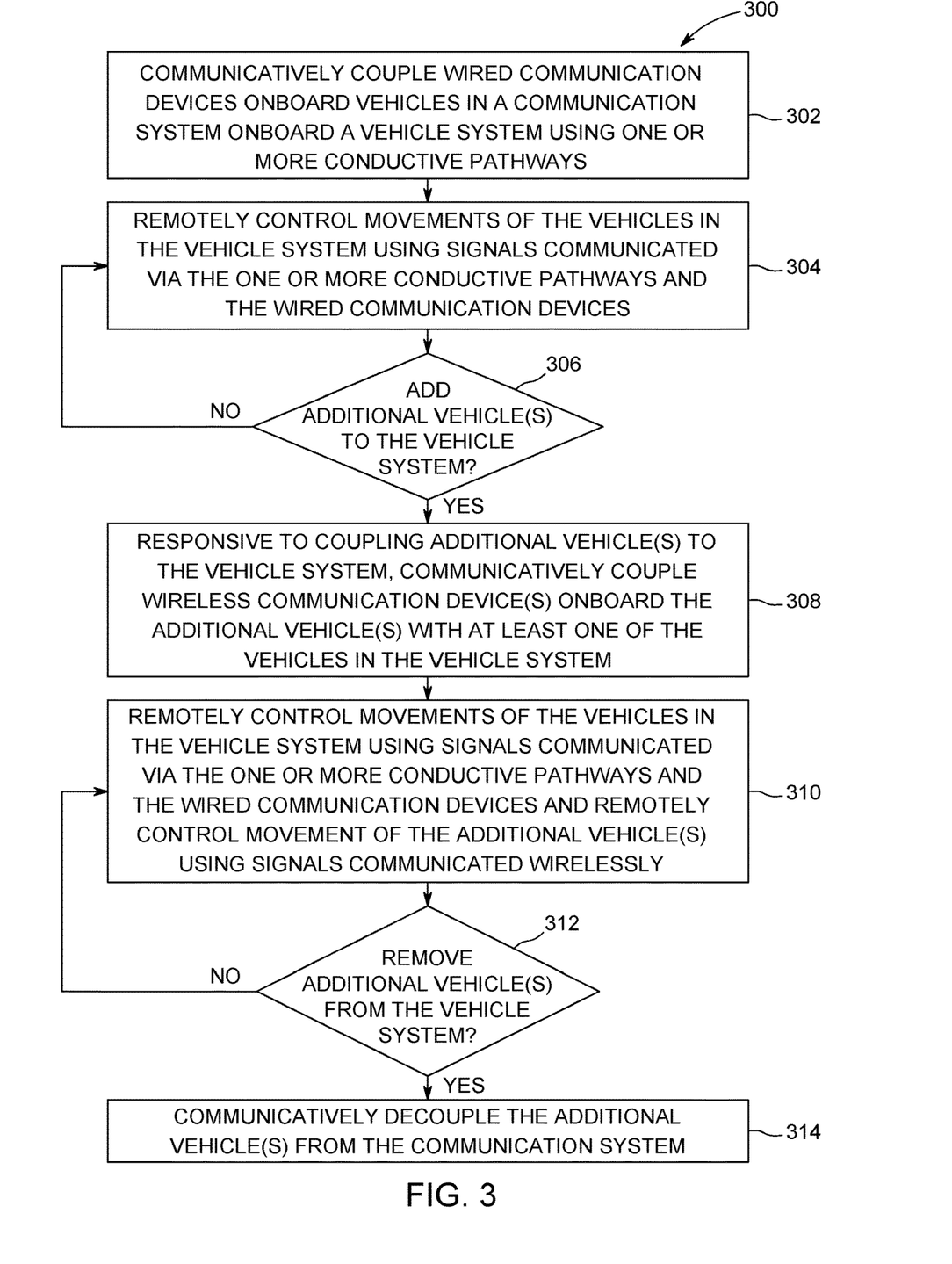
FIG. 3 illustrates a flowchart of one embodiment of a method of communicating between vehicles in a vehicle system.

FIG. 3 illustrates a flowchart of one embodiment of a method 300 of communicating between vehicles in a vehicle system. The method may be used to control operation of the communication system shown in FIGS. 1 and 2 to allow vehicles in the vehicle system to be remotely controlled from onboard a first vehicle in the vehicle system before a banker vehicle is added via wired connections, and also to allow the vehicles and the banker vehicle to be remotely controlled (via wired and wireless connections, respectively) from the first vehicle while the banker vehicle is added to the vehicle system. The method 200 can represent operations of a software application directing the operations performed by the vehicle system controller and/or the communication system, and/or may be used to create such a software application.

At 302, wired communication devices disposed onboard vehicles in the vehicle system are communicatively coupled with each other. These communication devices are wired in that the wired communication devices are disposed onboard separate vehicles in the vehicle system, but are connected with each other by one or more conductive pathways. The vehicles on which the wireless communication device are disposed may be propulsion-generating vehicles. Optionally, one or more of the vehicles on which the wired communication devices are disposed may be non-propulsion-generating vehicles.

At 304, movements of one or more of the vehicles in the vehicle system are remotely controlled. The movements of these vehicles may be remotely controlled from another vehicle of the vehicle system, such as a lead propulsion-generating vehicle. The vehicles having the movements that are remotely controlled may be referred to as remote propulsion-generating vehicles. The movements of these vehicles may be remotely controlled from onboard the vehicle system by communicating signals between the wired communication devices via the one or more conductive pathways. For example, a vehicle system controller disposed onboard the lead vehicle of the vehicle system may generate control signals that are conducted along the one or more conductive pathways to the wired communication devices of the remote vehicles.

Responsive to receiving these control signals, the wired communication devices of the remote vehicles may provide the control signals to vehicle controllers of the respective remote vehicles. As described below, the vehicle controllers may use these control signals to change the operational settings of the propulsion systems and/or braking systems of the remote vehicles. For example, the vehicle controllers may change throttle settings of one or more engines, brake settings, or the like.

At 306, a determination is made as to whether one or more additional vehicles are to be added to the vehicle system. As described above, one or more banker or helper vehicles may be added to the vehicle system. These vehicles may be added to the vehicle system to assist in propelling the vehicle system up an incline grade in the route, over a peak in the route, and/or to provide additional braking effort to slow or stop movement of the vehicle system.

The determination of whether or not any additional vehicles are to be added to the vehicle system may be made based on input received from an input device. For example, an operator disposed onboard a vehicle in the vehicle system (e.g., the lead vehicle) may provide input to the input device that indicates one or more vehicles are to be added to the vehicle system. Optionally, the one or more vehicles that are to be added to the vehicle system may wirelessly communicate an instructional signal to the lead vehicle the vehicle system to notify the lead vehicle that the additional vehicle or vehicles are to be added to the vehicle system.

If one or more additional vehicles are to be added to the vehicle system, flow of the method 300 can proceed toward 308. But, if the vehicle system is to continue moving without the addition of one or more vehicles, then the method 300 can return toward 304. In this manner, the method 300 can proceed in one or more loops during movement of the vehicle system along one or more routes unless and until one or more additional vehicles are to be added to the vehicle system.

At 308, the wireless communication devices onboard the additional vehicle or vehicles that are added to the vehicle system are communicatively coupled with at least one of the vehicles in the vehicle system. For example, the additional vehicle or vehicles that are added to the vehicle system may wirelessly communicate a coupling signal using the wireless communication devices of the additional vehicle or vehicles to the wireless communication device of the lead vehicle in the vehicle system. Responsive to receiving this coupling signal, the vehicle system controller determines that the additional vehicles are to be added to the vehicle system, and communicatively couples the wireless communication devices of the additional vehicle(s) with the wireless communication device of the lead vehicle.

The wireless communication devices may be communicatively coupled by the wireless communication devices communicating, or exchanging, wireless signals. For example, the wireless communication device of one of the vehicles being added to the vehicle system may communicate a request signal to a wireless communication device of the vehicle system. Responsive to receiving this request signal, the wireless communication device onboard the vehicle system may wirelessly communicate a confirmation signal back to the wireless communication device of the one or more vehicles being added to vehicle system. Responsive to receiving the confirmation signal, the wireless communication device or devices of the vehicles being added to the vehicle system may be communicatively coupled with the wireless communication devices already onboard the vehicle system. By communicatively coupled, these wireless communication devices may have an agreed-upon or default frequency or range of frequencies to be used to communicate the wireless signals between each other, may have a shared encryption key used to wirelessly communicate signals between the devices, or the like.

At 310, movements of the vehicles in the vehicle system are remotely controlled by control signals communicated between the wired communication devices and between the wireless communication devices. For example, the lead vehicle can remotely control throttle settings, brake settings, speeds, etc., of the vehicles that were in the vehicle system prior to adding the additional vehicles by communicating the control signals over, through, or via the one or more conductive pathways extending between the wired communication devices. The lead vehicle can concurrently or simultaneously remotely control throttle settings, brake settings, speeds, etc., of the vehicles that were added to the vehicle system by wirelessly communicating the control signals between the wireless communication devices.

The movements of the vehicles in the vehicle system (e.g., the vehicles in the vehicle system prior to adding the additional vehicle(s) and the additional vehicles added to the vehicle system) may be remotely controlled by a lead vehicle in the vehicle system for at least a temporary portion or segment of a trip of the vehicle system. This temporary portion or segment of the trip can include travel up an inclined grade in the route in which additional tractive effort is needed to help propel the vehicle system up the grade, travel over a peak in a hill for which additional tractive effort is needed to help propel the vehicle system over the peak, and/or travel down a decline in the route in which additional braking effort is needed to help stop or slow movement of the vehicle system.

Once the vehicle system and additional vehicles have completed travel over the segment or portion of the trip for which the additional tractive effort and/or braking effort was needed, the additional vehicles may be decoupled from the vehicle system. This decoupling may involve mechanically decoupling additional vehicles (for example, mechanically detaching the additional vehicles from the vehicles previously in the vehicle system or disengaging the additional vehicles from the other vehicles). Optionally, this decoupling can involve logically decoupling the additional vehicles from the other vehicles in the vehicle system, such as by terminating the communicative coupling between the wireless communication devices of the additional vehicle(s) and the lead vehicle in the vehicle system.

At 312, a determination is made as to whether or not one or more of the additional vehicles are to be removed from the vehicle system. As described above, once the vehicle system completes travel over the segment a portion of the trip for which the additional vehicles were needed, one or more, or all, of the additional vehicles added at 308 may be decoupled or removed from the vehicle system.

The determination of whether or not the additional vehicles are to be removed from the vehicle system may be made based on input provided from an operator. For example, responsive to an operator providing input via the input device onboard the lead vehicle, the vehicle system controller of the lead vehicle may determine that additional vehicles are to be removed from the vehicle system. As a result, flow of the method 300 can proceed toward 314. Optionally, the vehicle system controller can determine that the additional tractive effort and/or braking effort is no longer needed. For example, the vehicle system can include one or more location determining systems, such as a global positioning system receiver, a cellular antenna, etc., that receive wireless signals indicative of locations or useful in determining locations of the vehicle system (e.g., using triangulation or another technique). The vehicle system controller can examine the current location of the vehicle system and the location of the portion or segment in the route needing the additional tractive effort and/or braking effort (which may be stored in a memory of the vehicle system controller). If the vehicle system has passed the segment or portion of the route, then the vehicle system controller can determine that the additional vehicle(s) are no longer needed).

But, on the other hand, if the additional vehicles are still needed and are not yet to be removed from the vehicle system, flow of the method 300 can return toward 310. For example, the additional vehicles may be needed to provide additional tractive effort and/or braking effort during travel over one or more additional upcoming portions of the route.

At 314, the additional vehicles that were added to the vehicle system are communicatively decoupled from the communication system. This decoupling may involve the wireless communication devices onboard the additional vehicles stopping the communication links with the wireless communication device or devices onboard the lead vehicle. For example, the wireless communication device onboard the lead vehicle may wirelessly communicate a termination signal to the wireless communication devices of the additional vehicles. Responsive to receiving the termination signal, the wireless communication devices of the additional vehicles may stop communicating with the wireless communication device of the lead vehicle. For example, the wireless communication device of the additional vehicles may stop sending signals to the wireless communication device of lead vehicle, and/or the wireless communication device of the additional vehicles may stop acting upon, receiving, or otherwise operating according to signals received from the wireless communication device of the lead vehicle. The communication link or links between the wireless communication devices of the lead vehicle and the additional vehicle(s) may be terminated while the vehicle system controller continues sending control signals to the wired communication devices of the vehicles in the vehicle system via the conductive pathways for remotely controlling the movement of those vehicles.

The method 300 may then terminate, or optionally may be repeated one or more additional times. For example, if the vehicle system reaches another segment or portion of the route in which additional vehicles are needed to help propel or brake the vehicle system, the method 300 may be repeated in whole or in part.

Figure 4:
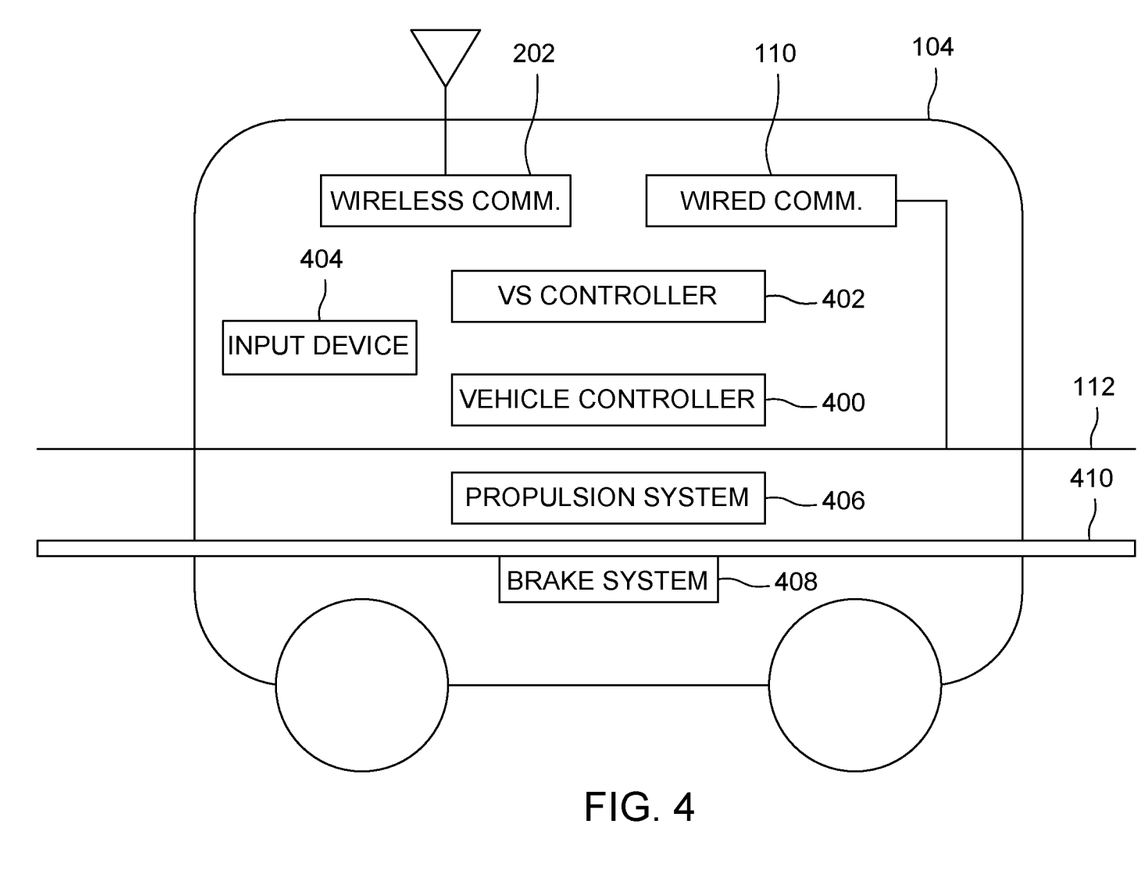
FIG. 4 illustrates one embodiment of a propulsion-generating vehicle shown in FIGS. 1 and 2.

FIG. 4 illustrates one embodiment of one of the propulsion-generating vehicles 104 shown in FIGS. 1 and 2. As described above, the vehicle can include a wired communication device 110 ("Wired Comm" in FIG. 4) that is connected with one or more conductive pathways 112 extending along the length of the vehicle system. The conductive pathways can represent one or more wires, cables, conductive buses, or the like, that connect two or more wired communication devices in different vehicles. The wireless communication device 202 ("Wireless Comm" in FIG. 4) shown in FIG. 4 represents transceiving circuitry, such as one or more antennas, modems, radios, or the like, that can wirelessly communicate signals with other wireless communication devices.

In one embodiment, not all of the vehicles in the vehicle system have both the wired and wireless communication devices. For example, at least the lead vehicle of the vehicle system may have both the wired and the wireless communication devices, but one or more, or at all, of the other vehicles in the vehicle system may not include the wireless communication device (e.g., the vehicles in the vehicle system other than the lead vehicle prior to adding the additional vehicles). Alternatively, two or more of the vehicles in the vehicle system may include both the wired communication device and the wireless communication device.

A vehicle controller 400 represents hardware circuitry that includes and/or represents one or more processors (one or more microprocessors, field programmable gate arrays, and/or integrated circuits) that perform various functions to control movement of the vehicle. For example, the vehicle controller can receive control signals received from an input device 404 that dictate throttle settings, brake settings, or the like, of the vehicle 104. The vehicle controller optionally can receive control signals from the vehicle system controller, which determines the operational settings (e.g., throttle settings, brake settings, speeds, etc.) for plural vehicles in the vehicle system. For example, the vehicle system controller onboard the lead vehicle can send a throttle setting for the lead vehicle to the vehicle controller, which then uses the signal to control the propulsion system and/or brake system, or may directly send the control signal to the propulsion system and/or brake system, for controlling the movement of the vehicle. The vehicle controller of a remote and/or additional vehicle may receive the control signal from the vehicle system controller of the lead vehicle and control the propulsion system and/or brake system accordingly.

The vehicle system controller 402 ("VS Controller" shown in FIG. 4) represents hardware circuitry that includes and/or is connected with one or more processors (microprocessors, field programmable gate arrays, and/or integrated circuits) that perform various functions to remotely control operations one or more other vehicles in the vehicle system (including one or more additional vehicles added to the vehicle system). For example, the vehicle system controller can receive control signals from the input device that are used to remotely control throttle settings, speeds, brake settings, or the like, of one or more other vehicles. Responsive to receiving these remote control signals, the vehicle system controller can generate control signals that are sent to the other vehicles using the wired communication device and/or the wireless communication device, as described herein.

The propulsion system 406 shown in FIG. 4 represents one or more devices that perform work to generate tractive effort that propels the vehicle 104. For example, the propulsion system can represent one or more engines, alternators, generators, batteries, motors, or the like, the propel the vehicle 104. The brake system 408 shown in FIG. 4 is one or more braking devices of the vehicle 104. The brake system can represent air brakes that are fluidly coupled with a brake type 410. Optionally, the brake system can represent one or more friction brakes. In one embodiment, the brake system can represent one or more motors of the propulsion system that operate in a regenerative or dynamic braking mode in order to slow or stop movement of the vehicle.

The brake pipe 410 is a conduit that fluidly couples air brakes of two or more vehicles 104 and/or 106 in the vehicle system. In one embodiment, the additional vehicles that are added to the vehicle system may include the brake system that includes air brakes, but the air brakes and brake pipes of the additional vehicles are not fluidly coupled with the brake pipe(s) and air brake systems of the vehicles 104 already in the vehicle system. Instead, the additional vehicles can be mechanically coupled or engage the vehicle system without the brake systems of the additional vehicles being fluidly coupled with the air brake system of the vehicle system. This can speed up coupling and detachment of additional vehicles to and from the vehicle system (relative to adding vehicles with brake systems that are fluidly coupled with the other vehicles in the vehicle system).

Although not shown in FIG. 4, the components of FIG. 4 may be communicatively coupled with each other by one or more wired and/or wireless connections.

In one embodiment, the vehicles 104 of the vehicle system 102 may be configured only for wired communication between the vehicles 104. For example, the conductive pathway(s) 112 may extend between the vehicles 104 (even if the vehicles 104 are separated by one or more non-propulsion-generating vehicles 106) and may only communicate along, through, or via the conductive pathway(s) 112. The additional vehicle(s) 200 that are added to the vehicles 104 may only communicate with the vehicles 104 using wireless communication (and may automatically establish a wireless connection), and may not be connected with the vehicles 104 by any wired communication link (e.g., through, over, or via the conductive pathways 112).

The vehicles 104 may be retrofitted to include circuitry providing the ability to perform the operations described herein. For example, the vehicles 104 may be manufactured to include the wired communication device 110, but not the ability to wirelessly communicate with the helper vehicles. The vehicles 104 may have the wireless communication device 202 and associated circuitry added to the vehicles 104 to allow the vehicles 104 to wirelessly communicate with the helper vehicles, as described herein.

In one embodiment, a system includes plural wired communication devices disposed onboard different first vehicles of a vehicle system formed from the first vehicles, one or more wireless communication devices disposed onboard one or more second vehicles, and a vehicle system controller configured to be disposed onboard the vehicle system. The vehicle system controller is configured to remotely control movement of one or more of the first vehicles via communication with the wired communication devices disposed onboard the one or more first vehicles and to establish a wireless communication link with the one or more second vehicles. The controller also is configured to remotely control movement of the one or more second vehicles via wireless communication with the one or more wireless communication devices, responsive to the one or more second vehicles being connected to the vehicle system for temporarily assisting in vehicle system movement along one or more routes. The one or more second vehicles are configured to be disconnected from wired communication with the first vehicles subsequent to being connected to the vehicle system. The wireless communication link is in addition to any wireless communication links established in the vehicle system prior to the one or more second vehicles being connected to the vehicle system.

Optionally, the vehicle system controller is configured to remotely control the movement of the one or more second vehicles subsequent to the one or more second vehicles being one or more of mechanically or logically coupled with the first vehicles of the vehicle system.

Optionally, the wired communication devices are communicatively coupled with each other by one or more conductive pathways extending along the vehicle system between the first vehicles of the vehicle system.

Optionally, the vehicle system controller is configured to remotely control the movement of the one or more first vehicles via the wired communication devices without remotely controlling the movement of the one or more second vehicles via the one or more wireless communication devices during movement of the vehicle system along the one or more routes prior to the one or more second vehicles being one or more of mechanically or logically coupled with the first vehicles.

Optionally, the vehicle system controller is configured to remotely control the movement of the one or more first vehicles via the wired communication devices and to remotely control the movement of the one or more second vehicles via the one or more wireless communication devices during the movement of the vehicle system along the one or more routes subsequent to the one or more second vehicles being one or more of mechanically or logically coupled with the first vehicles.

Optionally, the vehicle system controller is configured to remotely control the movement of the one or more first vehicles via the wired communication devices only and not by wireless communications. The one or more first vehicles may be all of the propulsion generating vehicles in the vehicle system prior to the one or more second vehicles being connected to the vehicle system.

Optionally, the first vehicles include brake systems that are fluidly coupled with each other in the vehicle system and the vehicle system controller is configured to remotely control operation of the brake systems of the first vehicles.

The one or more second vehicles may include one or more brake systems that are fluidly separate from the brake systems of the first vehicles and the vehicle system controller is configured to remotely control operation of the one or more brake systems of the one or more second vehicles.

Optionally, the vehicle system controller is configured to remotely control the brake systems of the first vehicles that are fluidly coupled with each other and the one or more brake systems of the one or more second vehicles that are not fluidly coupled with the brake systems of the first vehicles subsequent to one or more of mechanically or logically coupling the first vehicles with the one or more second vehicles.

Optionally, the vehicle system controller is configured to remotely control the movement of the one or more first vehicles via communication with the wired communication devices onboard the one or more first vehicles and to remotely control the movement of the one or more second vehicles of the vehicle system without communicatively coupling the one or more second vehicles with the vehicle system controller via the wired communication devices.

In one embodiment, a system includes a vehicle system controller configured to be disposed onboard a lead vehicle in a vehicle system formed from the lead vehicle and one or more remote vehicles. The vehicle system controller is configured to communicate one or more control signals to the one or more remote vehicles via wired communication devices conductively coupled with each other. The one or more control signals remotely control movement of the one or more remote vehicles. Responsive to adding one or more additional vehicles to the vehicle system subsequent to the vehicle system traveling over at least a portion of one or more routes with the lead vehicle and the one or more remote vehicles and without the one or more additional vehicles, the vehicle system controller also is configured to establish one or more wireless communication connections with the one or more additional vehicles and to wirelessly communicate the one or more control signals with one or more additional vehicles via wireless communication devices to remotely control movement of the one or more additional vehicles.

Optionally, the vehicle system controller is configured to communicate the one or more control signals with the one or more remote vehicles concurrently or simultaneously with wireless communication of the one or more control signals with the one or more additional vehicles.

Optionally, the vehicle system controller is configured to communicate the one or more control signals with the one or more remote vehicles by conducting the one or more control signals through one or more conductive pathways extending along the vehicle system.

Optionally, the vehicle system controller is configured to remotely control the movement of the one or more remote vehicles via the wired communication devices without remotely controlling the movement of the one or more additional vehicles via the one or more wireless communication devices during movement of the vehicle system along the one or more routes prior to the one or more additional vehicles being added to the vehicle system.

Optionally, the vehicle system controller is configured to remotely control the movement of the one or more remote vehicles via the wired communication devices and to remotely control the movement of the one or more additional vehicles via the wireless communication devices during the movement of the vehicle system along the one or more routes subsequent to the one or more additional vehicles being added to the vehicle system.

Optionally, the vehicle system controller is configured to remotely control the movement of the one or more remote vehicles via communication with the wired communication devices onboard the one or more remote vehicles and to remotely control the movement of the one or more additional vehicles of the vehicle system without communicatively coupling the one or more additional vehicles with the vehicle system controller via one or more conductive pathways.

Optionally, the lead vehicle and the one or more remote vehicles are all the propulsion generating vehicles in the vehicle system prior to addition of the one or more additional vehicles, wherein the lead vehicle and at least one of the one or more remote vehicles are separated by at least one non-propulsion generating vehicle of the vehicle system. The vehicle system controller may be configured to communicate the one or more control signals to the one or more remote vehicles via the wired communication devices only and not using wireless communications.

In one embodiment, a system includes a vehicle system controller configured to be disposed onboard a vehicle system having plural first propulsion generating vehicles. At least some of the propulsion generating vehicles are separated from one another by non-propulsion generating vehicles. The vehicle system controller is configured to control all the plural propulsion generating vehicles of the vehicle system using a wired connection only. The system also includes a wireless communication unit configured to be disposed onboard the vehicle system. The vehicle system controller is configured to control the wireless communication unit to automatically establish at least one wireless communication link with one or more second propulsion generating vehicles, for remote control of the one or more second propulsion generating vehicles using wireless communications only, responsive to the one or more second propulsion generating vehicles being temporarily coupled to the vehicle system for assisting in movement of the vehicle system.

In one embodiment, a method includes remotely controlling movement of one or more remote vehicles in a vehicle system that also includes a lead vehicle by communicating one or more control signals to the one or more remote vehicles via wired communication devices conductively coupled with each other. The method also includes, subsequent to controlling the movement of the one or more remote vehicles via the wired communication devices and responsive to one or more additional vehicles being added to the vehicle system, remotely controlling movement of the one or more additional vehicles by wirelessly communicating the one or more control signals to the one or more additional vehicles concurrently or simultaneously with communication of the one or more control signals to the one or more remote vehicles via the wired communication devices.

Optionally, remotely controlling the movement of the one or more remote vehicles includes conducting the one or more control signals through one or more conductive pathways extending along the vehicle system.

Optionally, remotely controlling the movement of the one or more additional vehicles begins responsive to the one or more additional vehicles being combined with the vehicle system.

Optionally, the method also includes remotely controlling the movement of the one or more remote vehicles via the wired communication devices without remotely controlling the movement of the one or more additional vehicles via the one or more wireless communication devices during movement of the vehicle system along one or more routes prior to the one or more additional vehicles being added to the vehicle system.

Optionally, wirelessly communicating the one or more control signals to the one or more additional vehicles terminates responsive to the one or more additional vehicles being separated from the vehicle system.

Optionally, the movement of the one or more additional vehicles is remotely controlled without fluidly coupling a brake system of the one or more additional vehicles with a brake system of the vehicle system.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Other embodiments may be apparent to one of ordinary skill in the art upon reviewing the above description. The scope of the inventive subject matter should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
plural wired communication devices disposed onboard different first vehicles of a vehicle system formed from the first vehicles;
one or more wireless communication devices disposed onboard one or more second vehicles; and
a vehicle system controller configured to be disposed onboard the vehicle system, the vehicle system controller configured to remotely control movement of one or more of the first vehicles via communication with the wired communication devices disposed onboard the one or more first vehicles prior to the one or more second vehicles being connected to the vehicle system, the vehicle system controller configured to receive a wireless instructional signal from the one or more second vehicles prior to the one or more second vehicles being connected to the vehicle system, wherein the wireless instructional signal notifies the vehicle system controller that the one or more second vehicles are to be added to the vehicle system, the vehicle system controller also configured to establish a wireless communication link with the one or more second vehicles responsive to the one or more second vehicles being connected to the vehicle system for temporarily assisting with movement of the vehicle system along one or more routes,
wherein the vehicle system controller is configured to control the movement of the one or more first vehicles by communicating with the one or more first vehicles via communication with the wired communication devices while concurrently controlling the movement of the one or more second vehicles by communicating with the one or more second vehicles via the wireless communication link,
wherein the one or more second vehicles are configured to be disconnected from wired communication with the first vehicles subsequent to being connected to the vehicle system, and
wherein the wireless communication link is in addition to any wireless communication links established in the vehicle system prior to the one or more second vehicles being connected to the vehicle system.

2. The system of claim 1, wherein the vehicle system controller is configured to remotely control the movement of the one or more second vehicles subsequent to the one or more second vehicles being one or more of mechanically or logically coupled with the first vehicles of the vehicle system.

3. The system of claim 1, wherein the wired communication devices are communicatively coupled with each other by one or more conductive pathways extending along the vehicle system between the first vehicles of the vehicle system.

4. The system of claim 1, wherein the vehicle system controller is configured to remotely control the movement of the one or more first vehicles via the wired communication devices without remotely controlling the movement of the one or more second vehicles via the one or more wireless communication devices during movement of the vehicle system along the one or more routes prior to the one or more second vehicles being one or more of mechanically or logically coupled with the first vehicles.

5. The system of claim 4, wherein the vehicle system controller is configured to remotely control the movement of the one or more first vehicles via the wired communication devices and to remotely control the movement of the one or more second vehicles via the one or more wireless communication devices during the movement of the vehicle system along the one or more routes subsequent to the one or more second vehicles being one or more of mechanically or logically coupled with the first vehicles.

6. The system of claim 5, wherein the vehicle system controller is configured to remotely control the movement of the one or more first vehicles via the wired communication devices only and not by wireless communications, and wherein the one or more first vehicles are all the propulsion-generating vehicles in the vehicle system prior to the one or more second vehicles being connected to the vehicle system.

7. The system of claim 1, wherein the first vehicles include air brake systems that are fluidly coupled with each other in the vehicle system and the vehicle system controller is configured to remotely control operation of the air brake systems of the first vehicles, and
wherein the one or more second vehicles include one or more air brake systems that are fluidly separate from the air brake systems of the first vehicles and the vehicle system controller is configured to remotely control operation of the one or more air brake systems of the one or more second vehicles.

8. The system of claim 7, wherein the vehicle system controller is configured to remotely control the brake systems of the first vehicles that are fluidly coupled with each other and the one or more brake systems of the one or more second vehicles that are not fluidly coupled with the brake systems of the first vehicles subsequent to one or more of mechanically or logically coupling the first vehicles with the one or more second vehicles.

9. The system of claim 1, wherein the vehicle system controller is configured to remotely control the movement of the one or more first vehicles via communication with the wired communication devices onboard the one or more first vehicles and to remotely control the movement of the one or more second vehicles of the vehicle system without communicatively coupling the one or more second vehicles with the vehicle system controller via the wired communication devices.

10. The system of claim 1, wherein the movement is controlled through throttle setting, brake setting, and speed, wherein the movement comprises tractive effort and braking effort.

11. The system of claim 1, wherein the vehicle system controller is configured to receive a wireless coupling signal from the one or more second vehicles in response to the one or more second vehicles being added to the vehicle system, and wherein, in response to receiving the coupling signal, the vehicle system determines that the one or more second vehicles are added to the vehicle system and communicatively couples to the wireless communication devices of the one or more second vehicles.

12. The system of claim 1, wherein the vehicle system controller is configured to receive a wireless coupling signal from the one or more additional propulsion-generating vehicles in response to the one or more additional propulsion-generating vehicles being added to the vehicle system, and wherein, in response to receiving the coupling signal, the vehicle system determines that the one or more additional propulsion-generating vehicles are added to the vehicle system and communicatively couples wireless communication devices of the one or more additional propulsion-generating vehicles.

13. A system comprising:
a vehicle system having a lead propulsion-generating vehicle, at least one remote propulsion-generating vehicle, and plural non-propulsion generating vehicles, wherein the lead propulsion-generating vehicle and the at least one remote propulsion-generating vehicle are separated by the plural non-propulsion generating vehicles;
one or more conductive pathways extending between the lead propulsion-generating vehicle and the at least one remote propulsion-generating vehicle;
plural wired communication devices respectively disposed onboard the lead propulsion-generating vehicle and the at least one remote propulsion-generating vehicle and electrically connected to the one or more conductive pathways, wherein the lead propulsion-generating vehicle and the at least one remote propulsion-generating vehicle are configured for the lead propulsion-generating vehicle to control movement of each of the at least one remote propulsion-generating vehicle only through the wired communication devices and the one or more conductive pathways;
a vehicle system controller disposed onboard the lead propulsion-generating vehicle, the vehicle system controller configured to automatically establish a wireless communication link with one or more additional propulsion-generating vehicles, for the lead propulsion-generating vehicle to remotely control movement of the one or more additional propulsion-generating vehicles via wireless communication while also controlling the movement of the at least one remote propulsion-generating vehicle through the wired communication devices and the one or more conductive pathways, responsive to the one or more additional propulsion-generating vehicles being connected to the vehicle system for temporarily assisting in vehicle system movement along one or more routes, the vehicle system controller configured to receive a wireless instructional signal from the one or more additional propulsion-generating vehicles prior to the one or more additional propulsion-generating vehicles being connected to the vehicle system, wherein the wireless instructional signal notifies the vehicle system controller that the one or more additional propulsion generating vehicles are to be added to the vehicle system,
wherein the additional propulsion-generating vehicles are not connected with any of the lead propulsion-generating vehicle and the at least one remote propulsion-generating vehicle by any wired communication link, and
wherein the wireless communication link is in addition to any wireless communication links established in the vehicle system prior to the one or more additional propulsion-generating vehicles being connected to the vehicle system for temporarily assisting in the vehicle system movement along the one or more routes.

14. The system of claim 13, wherein the movement comprises tractive effort and braking effort wherein the movement is controlled through throttle setting, brake setting, and speed.

15. A system comprising:
plural wired communication devices disposed onboard different first vehicles of a vehicle system formed from the first vehicles, wherein the wired communication devices are communicatively coupled with each other by one or more conductive pathways extending along the vehicle system between the first vehicles of the vehicle system;
one or more wireless communication devices disposed onboard one or more second vehicles; and
a vehicle system controller configured to be disposed onboard the vehicle system, the vehicle system controller configured to remotely control movement of one or more of the first vehicles via communication with the wired communication devices disposed onboard the one or more first vehicles and to establish a wireless communication link with the one or more second vehicles, to remotely control movement of the one or more second vehicles via wireless communication with the one or more wireless communication devices, responsive to the one or more second vehicles being connected to the vehicle system for temporarily assisting in vehicle system movement along one or more routes, the vehicle system controller configured to receive a wireless instructional signal from the one or more second vehicles prior to the one or more second vehicles being connected to the vehicle system, wherein the wireless instructional signal notifies the vehicle system controller that the one or more second vehicles are to be added to the vehicle system,
wherein the one or more second vehicles are configured to be disconnected from wired communication with the first vehicles subsequent to being connected to the vehicle system,
wherein the wireless communication link is in addition to any wireless communication links established in the vehicle system prior to the one or more second vehicles being connected to the vehicle system,
wherein the vehicle system controller is configured to remotely control the movement of the one or more second vehicles subsequent to the one or more second vehicles being one or more of mechanically or logically coupled with the first vehicles of the vehicle system,
wherein the vehicle system controller is configured to remotely control the movement of the one or more first vehicles via the wired communication devices without remotely controlling the movement of the one or more second vehicles via the one or more wireless communication devices during movement of the vehicle system along the one or more routes prior to the one or more second vehicles being one or more of mechanically or logically coupled with the first vehicles,
wherein the vehicle system controller is configured to remotely control the movement of the one or more first vehicles via the wired communication devices and to concurrently remotely control the movement of the one or more second vehicles via the one or more wireless communication devices during the movement of the vehicle system along the one or more routes subsequent to the one or more second vehicles being one or more of mechanically or logically coupled with the first vehicles, and
wherein the vehicle system controller is configured to remotely control the movement of the one or more first vehicles via the wired communication devices only and not by wireless communications, and wherein the one or more first vehicles are all the propulsion generating vehicles in the vehicle system prior to the one or more second vehicles being connected to the vehicle system.

16. The system of claim 15, wherein the movement comprises tractive effort and braking effort, wherein the movement is controlled through throttle setting, brake setting, and speed.

17. The system of claim 15, wherein the vehicle system controller is configured to receive a wireless coupling signal from the one or more second vehicles in response to the one or more second vehicles being added to the vehicle system, and wherein, in response to receiving the coupling signal, the vehicle system determines that the one or more second vehicles are added to the vehicle system and communicatively couples to the wireless communication devices of the one or more second vehicles.

* * * * *